US009995566B1

(12) United States Patent
Wacker, III

(10) Patent No.: US 9,995,566 B1
(45) Date of Patent: Jun. 12, 2018

(54) EYELINE SIGHTING DEVICE AND RELATED METHODS

(71) Applicant: Alfred G. Wacker, III, Palm Coast, FL (US)

(72) Inventor: Alfred G. Wacker, III, Palm Coast, FL (US)

(*) Notice: Subject to any disclaimer, the term of this patent is extended or adjusted under 35 U.S.C. 154(b) by 253 days.

(21) Appl. No.: 14/919,941

(22) Filed: Oct. 22, 2015

(51) Int. Cl.
*G01B 11/00* (2006.01)
*G01C 9/34* (2006.01)

(52) U.S. Cl.
CPC ............ *G01B 11/00* (2013.01); *G01C 9/34* (2013.01)

(58) Field of Classification Search
CPC ........ G01B 11/272; G01B 3/22; G01B 11/00; G01C 9/34
USPC .................................................. 33/228, 264
See application file for complete search history.

(56) References Cited

U.S. PATENT DOCUMENTS

| | | | | |
|---|---|---|---|---|
| 2,553,963 A * | 5/1951 | Dzus | ...................... | B62D 15/00 116/28 R |
| 4,919,214 A * | 4/1990 | Brown | ................. | A01B 69/001 172/430 |
| 5,094,001 A * | 3/1992 | Fraser | .................. | A01B 69/001 33/264 |
| 5,788,185 A * | 8/1998 | Hooper | .............. | B64D 11/0619 244/118.6 |
| 6,079,780 A * | 6/2000 | Bapst | ................... | B60N 2/2806 116/200 |
| 6,526,667 B1 * | 3/2003 | Staney | ................... | G01C 15/00 33/268 |
| 6,614,344 B1 * | 9/2003 | Frasher | ................ | B60N 2/0252 340/425.5 |
| 6,682,029 B1 * | 1/2004 | Dierkes | .................. | F16M 11/14 248/158 |
| 6,880,255 B2 * | 4/2005 | Pfuntner | ................ | B62D 15/02 116/28 R |
| 7,178,477 B2 * | 2/2007 | Johnston | ................ | B64D 45/00 116/28 R |
| 7,669,909 B2 * | 3/2010 | Reinhardt | ................ | B60N 2/02 296/65.01 |
| 7,921,570 B1 * | 4/2011 | Pulkrabek | ................ | F41G 1/467 124/87 |
| 7,926,192 B1 * | 4/2011 | Dordick | ................ | G06F 1/1607 33/286 |
| 8,595,949 B2 * | 12/2013 | Reichow | .................. | A61H 5/00 33/511 |
| 2003/0011743 A1 * | 1/2003 | Povlotsky | .............. | A61B 3/113 351/209 |
| 2003/0019117 A1 * | 1/2003 | Hoholik | ................. | B62D 15/00 33/264 |

(Continued)

OTHER PUBLICATIONS

Airline Transport Professionals: ATP Airline Pilot Training & Pilot Career Development, Nov. 26, 2013, entire document.

*Primary Examiner* — Yaritza Guadalupe-McCall
(74) *Attorney, Agent, or Firm* — Allen Dyer Doppelt & Gilchrist

(57) ABSTRACT

An eyeline sighting device includes a base portion for placing the device on a working surface and a top portion for visual alignment. The top portion includes a frame, at least one level for adjusting the position of the frame relative to a horizontal plane, a first sighting element, and a second sighting element. The pilot's position is adjusted until the second sighting element is brought into alignment with the first sighting element along the pilot's line of sight.

15 Claims, 7 Drawing Sheets

(56) References Cited

U.S. PATENT DOCUMENTS

2004/0169114 A1* 9/2004 Dierkes ............... F16M 13/02
  248/165
2012/0102767 A1* 5/2012 Pulkrabek .............. F41B 5/14
  33/228

* cited by examiner

EYELINE SIGHTING DEVICE AND RELATED METHODS

FIELD OF THE INVENTION

This invention relates to devices and methods for verifying proper eyeline, and more particularly, to eyeline sighting devices and methods to facilitate proper seat height adjustment in aircraft.

BACKGROUND OF THE INVENTION

When flying aircraft, a pilot's proper eyeline is important to ensure not only sufficient visibility outside the aircraft and of the instrument panel, but also to successful execution of various flight maneuvers including landing. A critical factor in proper eyeline is seat height, which is adjustable via a height adjustment mechanism and/or the use of cushions or other props. Particularly with new pilots, it can be difficult to develop a feel for proper eyeline, and various impromptu guides (e.g., tape on the window) have been employed as eyeline sighting aids. Some commercial aircraft have permanently installed eyeline sighting devices, but virtually no one learns to fly on such aircraft and such devices are not readily adaptable for use in other aircraft. Accordingly, further improvements are possible.

SUMMARY OF THE INVENTION

In view of the foregoing, it is an object of the present invention to provide a device that will facilitate the positioning of a pilot in an airplane. An eyeline sighting device includes a base portion for placing the device on a working surface and a top portion for visual alignment. The top portion includes a frame, at least one level for adjusting the position of the frame relative to a horizontal plane, a first sighting element, and a second sighting element. The pilot's position is adjusted until the second sighting element is brought into alignment with the first sighting element along the pilot's line of sight.

According to another embodiment of the invention, the device can be used to position a pilot in an aircraft by placing the base portion of the device on a working surface, for example, the cockpit dashboard of the aircraft, leveling the frame of the device, and visually aligning the first sighting element and the second sighting element along the line of sight of the pilot such that the center of the first sighting element, the center of the second sighting element, and the pilot's eye position all lie in the same horizontal plane.

These and other objects, aspects and advantages of the present invention will be better appreciated in view of the drawings and detailed description of a preferred embodiment.

DETAILED DESCRIPTION OF PREFERRED EMBODIMENTS

Figure 1:
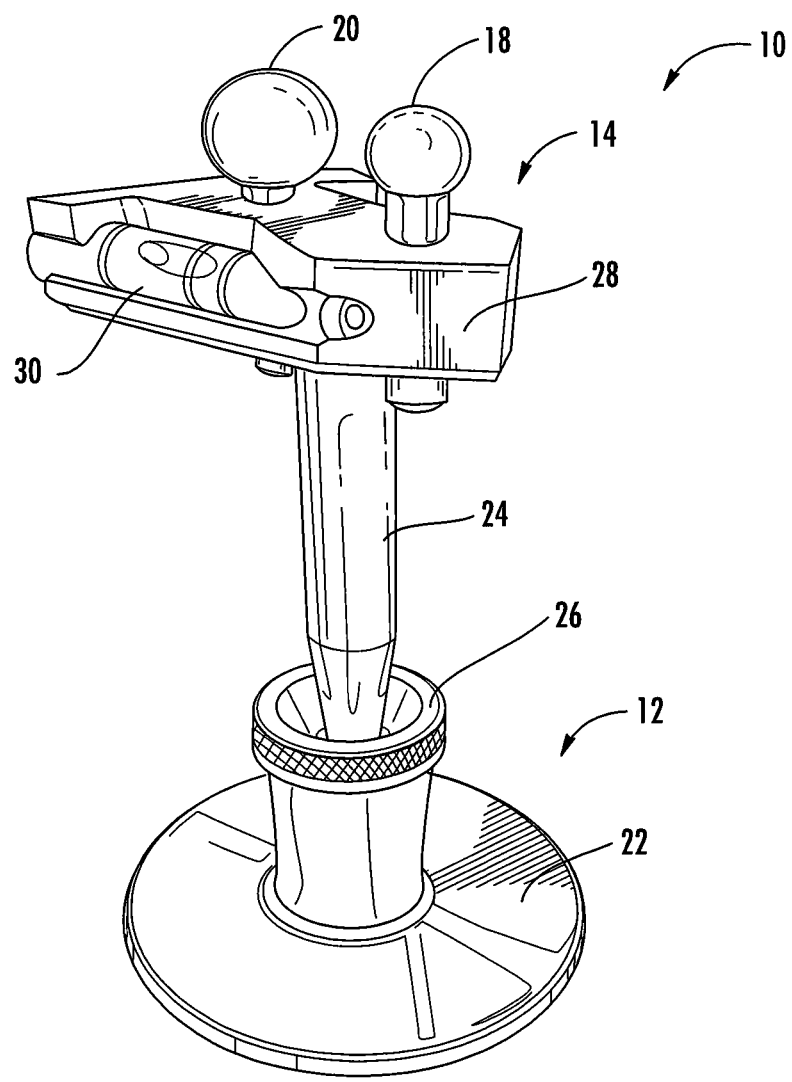
FIG. 1 is a perspective view of an eyeline sighting device, according to an embodiment of the present invention.
Figure 2:
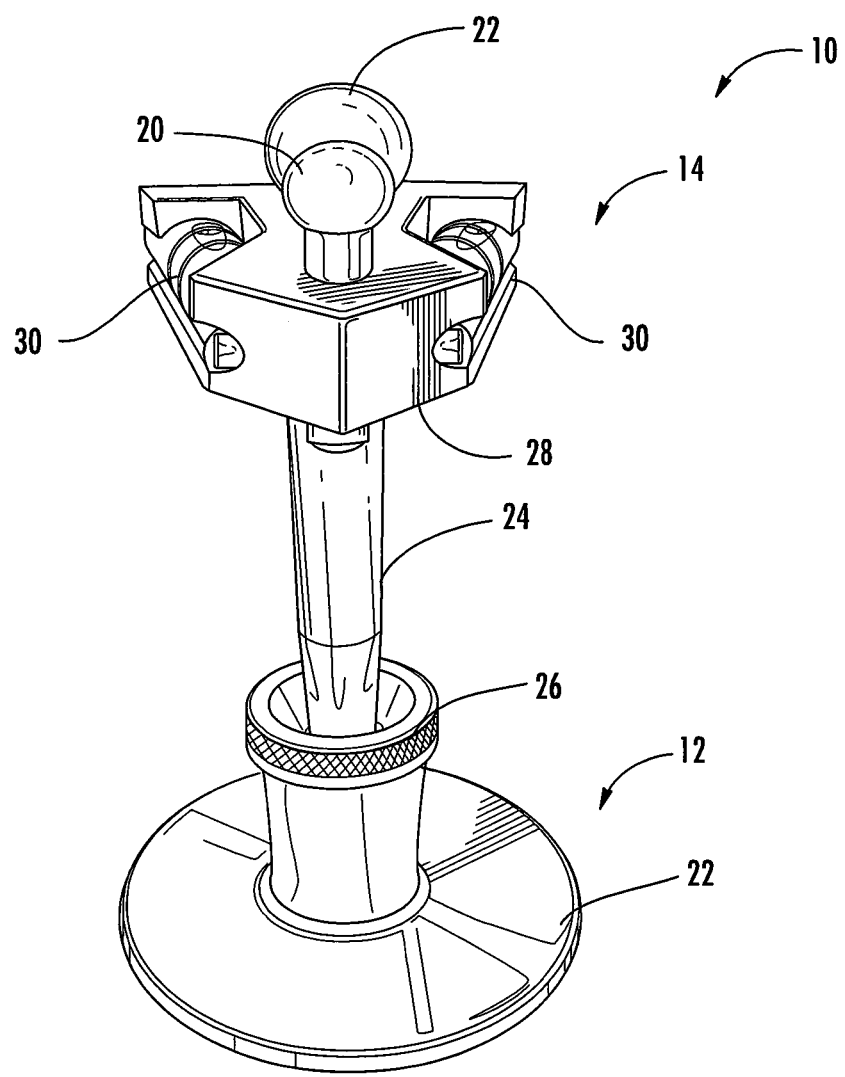
FIG. 2 is a front perspective view of the device of FIG. 1.
Figure 3:
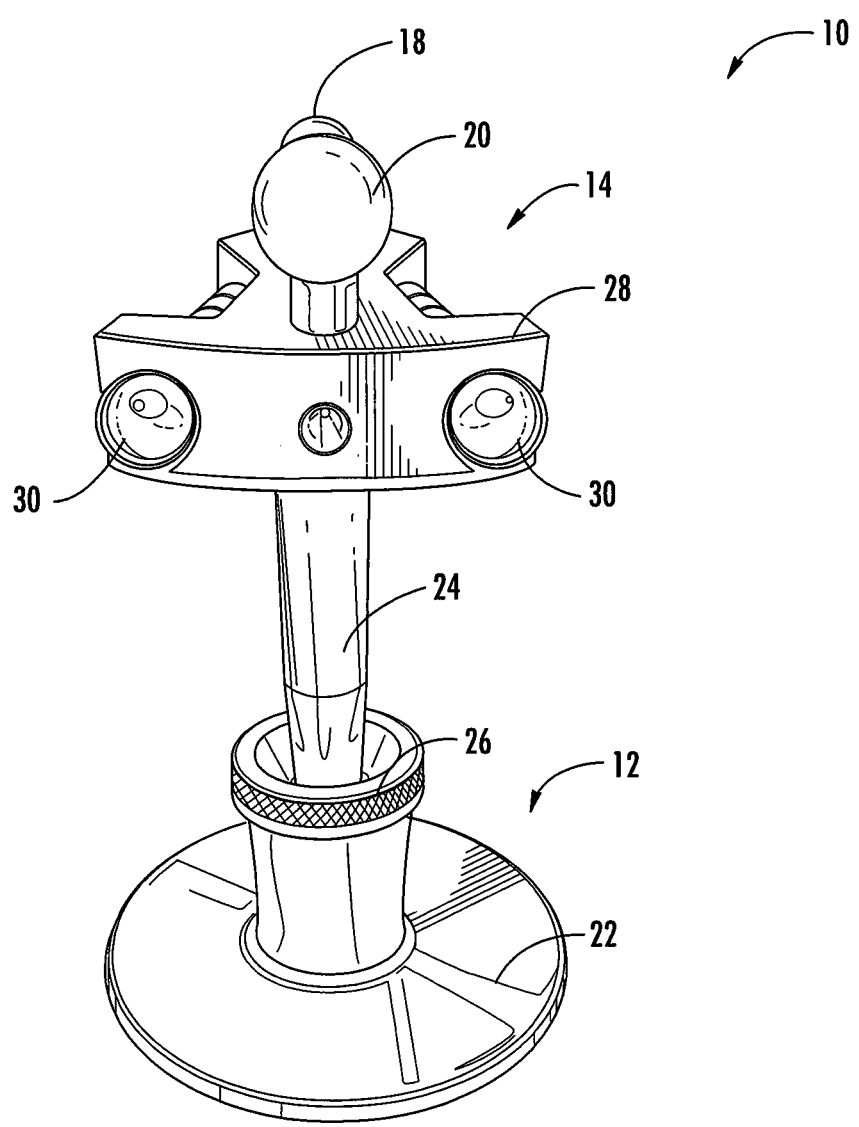
FIG. 3 is a rear perspective view of the device of FIG. 1.
Figure 4:
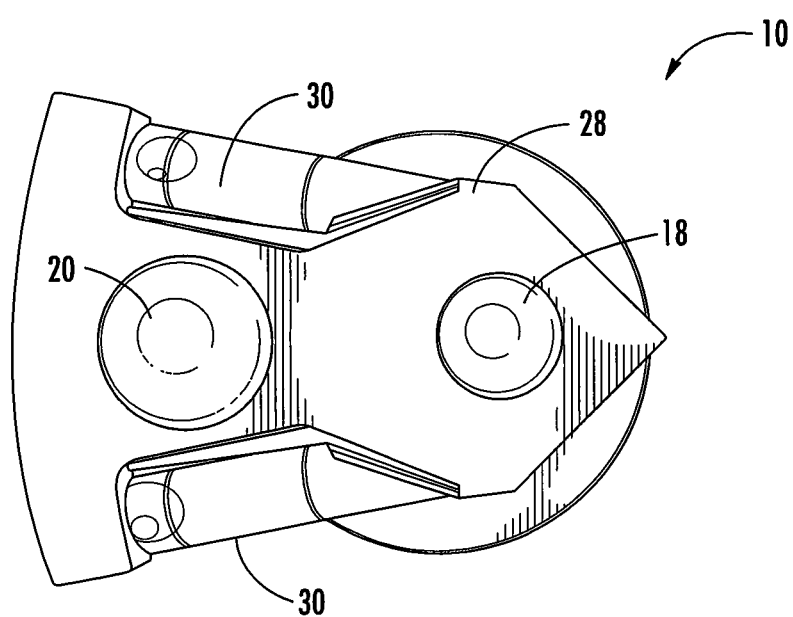
FIG. 4 is a top view of the device of FIG. 1.

According to an embodiment of the present invention, referring to FIGS. 1-5, an eyeline sighting device 10 includes a base portion 12 supporting a top portion 14. The base portion 12 adjustably supports the top portion 14 on a working surface such as a cockpit dashboard 16. The top portion 14 includes first and second sighting elements 18 and 20. With the top portion 14 properly positioned on the base portion 12, a pilot or other user of the device 10 is able to readily verify eyeline by visual alignment of the first and second sighting elements 18 and 20.

The base portion 12 includes a mounting base 22, a shaft 24, and adjustment joint 26 between the mounting base 22 and the shaft 24. The overall height of the base portion 12 can be a fixed height to be optimal for a wide range of aircraft. In an alternate embodiment, a height adjustment mechanism can be incorporated in the base. In the depicted embodiment, the adjustment joint 26 includes a ball and socket joint, allowing omni-directional angling of the shaft 24 and top portion 12 relative to the mounting base 22 for leveling purposes. The adjustment joint 26 can compensate non-horizontal or otherwise irregular geometry of the cockpit dashboard.

The top portion 14 includes a frame 28 connected to the shaft 24 and carrying the first and second sighting elements 18 and 20, as well as at least one level indicator 30. In one embodiment, the frame 28 is shaped like an arrow that points to a user (e.g., a pilot) when properly oriented. The first and second sighting elements 18 and 20 can be round, cubical or other shapes. The second sighting element 20 is larger than the first sighting element 18 so it can be seen behind the first sighting element 18. The first and second sighting elements 18 and 20 can also have contrasting colors to facilitate visual alignment. For example, the first sighting element 18 is black and the second sighting element 20 is red.

The at least one level indicator 30 is used to adjust the position of the frame 28 relative to a horizontal plane such that the center of the first and second sighting elements 18 and 20 are in the same horizontal plane. In the depicted embodiment, the top portion 14 includes two tubular liquid level indicators 30 on two opposite sides of the frame 28 oriented not in parallel. The first and second sighting elements 18 and 20 are mounted on the top of the frame 28 along the center line of the frame 28, as shown in FIGS. 1-5. Other types of level indicators, such as digital levels can also be used.

The device 10 is made of combination of made from molded or formed metal, alloy, plastics, other appropriate materials, or combinations thereof.

Figure 5:
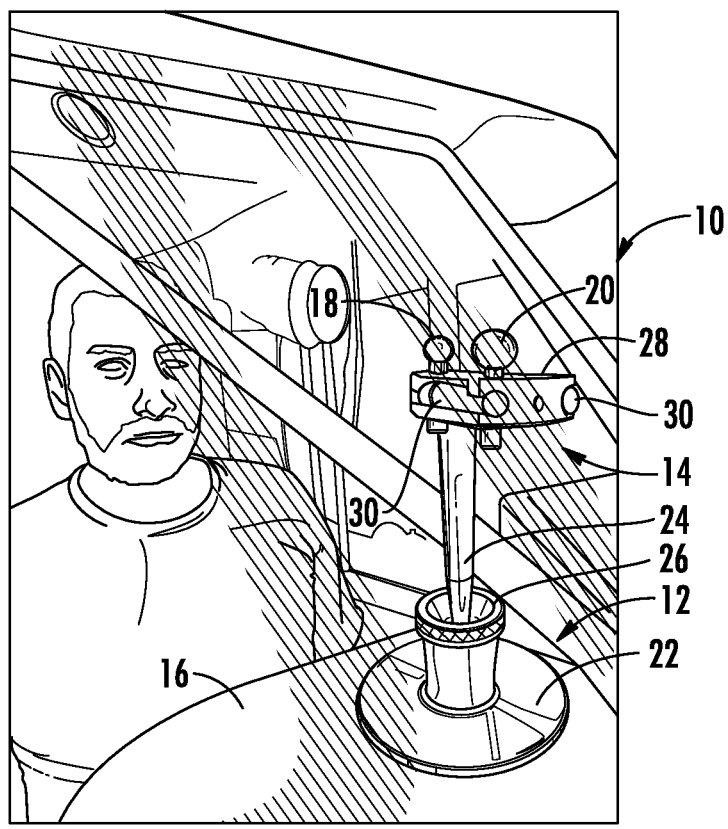
FIG. 5 is a perspective view of the device of FIG. 1 positioned in an aircraft cockpit.
Figure 6:
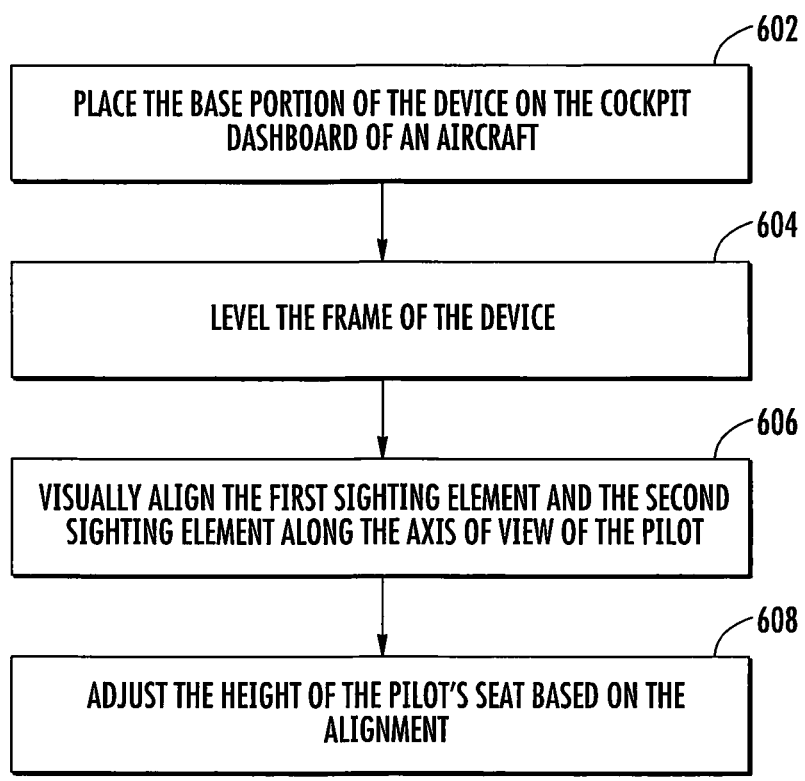
FIG. 6 is a flow chart illustration an example method for positioning a pilot in an aircraft using the device of FIG. 1.

Referring to FIG. 6, a method for positioning a pilot in an aircraft using the device 10 is illustrated. At step 602 the device 10 is placed on a working surface such as the cockpit dashboard of an aircraft, as shown in FIG. 5. The device 10 is positioned such that the frame 28 points at the pilot and the second sighting element 20 (larger element) will be visible behind the first sighting element 18 (smaller element).

At step 604, the frame 28 of the device 10 is leveled. For example, the frame 28 of the device 10 can be adjusted by manipulating the position of shaft 24 via the adjustment joint 26 to compensate non-horizontal or otherwise irregular geometry of the cockpit dashboard.

Figure 7A:
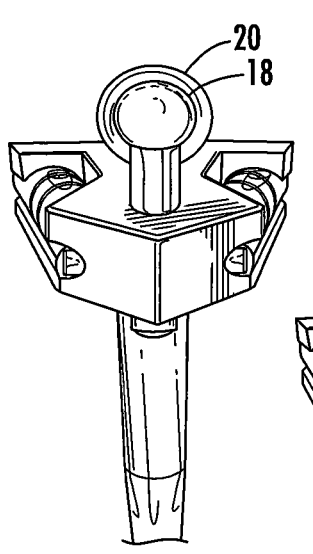
FIG. 7A is a front view of the device of FIG. 1 indicating proper eyeline.

At step 606, the first sighting element and the second sighting element are visually aligned along the axis of view of the pilot such that the center of the first sighting element 18 and second sighting element 20 and the pilot's eye position are on the same horizontal plane, as shown in FIG. 7A.

Figure 7B:
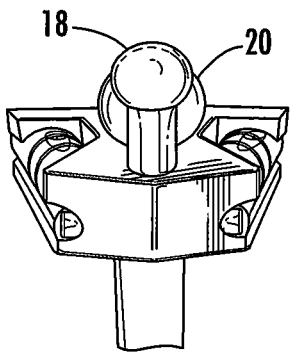
FIGS. 7B and 7C are front views of the device of FIG. 1 indicating improper eyeline.
Figure 7C:
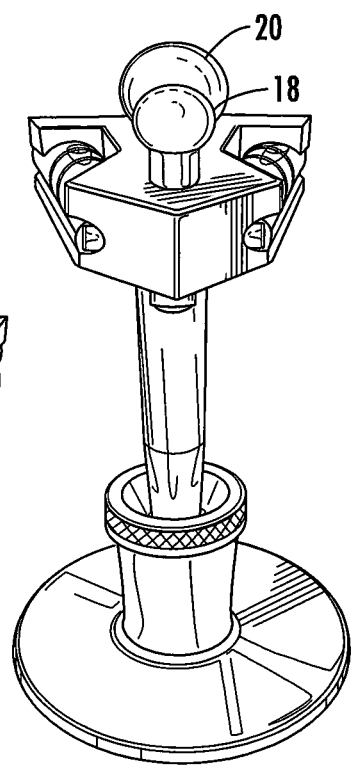

At step 608, the height of the pilot's seat is adjusted based on the alignment. The height of the pilot's seating position needs to be increased when the first sighting element 18 blocks the top portion of the second sighting element 20, as shown in FIG. 7B. The height of the pilot's seating position needs to be decreased when the first sighting element 18 blocks the bottom portion of the second sighting element 20, as shown in FIG. 7C.

In the depicted embodiment, the eyeline sighting device is used in connection with establishing proper eyeline for an aircraft pilot. While this is believed to be a particularly advantageous application, it will be appreciated that the present invention could also facilitate eyeline verification for other purposes.

The embodiment described above is provided for exemplary and illustrative purposes. Those skilled in the art will appreciate that the present invention is not necessarily limited to such an embodiment. Rather, numerous modifications, and adaptations for particular circumstances, fall within the scope of the invention as herein shown and described and of the claims appended hereto.

What is claimed is:

1. An eyeline sighting device comprising:
   a top portion including a frame, a first sighting element and a second sighting element; and
   a base portion adjustably supporting the top portion; and
   wherein the base portion includes a mounting base, a shaft, and an adjustment joint between the mounting base and the shaft, and the adjustment joint uses a circular omni-directional engagement;
   wherein the top portion further comprises at least two level indicators mounted on the frame; and
   wherein, with the base portion placed on a working surface and adjusted to hold the top portion in a predetermined orientation, proper eyeline is verified by visual alignment of the first and second sighting elements.

2. The device of claim 1, wherein the vertical distance between the bottom of the base portion and the center of the first sighting element is about 5.25 inches.

3. The device of claim 1, wherein the first sighting element and the second sighting element are not equal in size.

4. The device of claim 1, wherein the first sighting element and the second sighting element are spherical.

5. The device of claim 1, wherein the first sighting element and the second sighting element are marked in different colors.

6. The device of claim 1, wherein the at least two level indicator are tubular liquid levels.

7. The device of claim 1, wherein the working surface is the cockpit dashboard.

8. A method for pilot positioning in an aircraft using an eyeline sighting device, wherein the device comprises a top portion including a frame, a first sight element and a second sighting element, and a base portion adjustably supporting the top portion, the method comprising:
   placing the base portion on a cockpit dashboard;
   leveling the frame of the device via a circular omni-directional adjustment joint, and
   visually aligning the first sighting element and the second sighting element; and
   adjusting the height of the pilot's seat based on the alignment.

9. The method of claim 8, wherein adjusting the height of the pilot's seat based on the alignment comprises decreasing the height of the driver's seat when the first sighting element blocks the bottom portion of the second sighting element.

10. The method of claim 8, wherein adjusting the height of the driver's seat based on the alignment comprises increasing the height of the driver's seat when the first sighting element blocks the top portion of the second sighting element.

11. The method of claim 8, wherein the base portion includes a mounting base, a shaft, and adjustment joint between the mounting base and the shaft.

12. An eyeline sighting device comprising:
   a top portion including a frame, at least two level indicators, a first sighting element, and second sighting element; and
   a base portion adjustably supporting the top portion; and
   wherein the base portion includes a mounting base, a shaft, and an adjustment joint between the mounting base and the shaft, and wherein the adjustment joint uses a circular omni-directional engagement, with the base portion placed on a working surface and adjusted to hold the top portion in a predetermined orientation, proper eyeline is verified by visual alignment of the first and second sighting elements.

13. The device of claim 12, wherein the at least two level indicators includes two tubular liquid levels.

14. The device of claim 12, wherein the first sighting element and the second sighting element are marked in different colors.

15. The device of claim 12, wherein the vertical distance between the bottom of the base portion and the center of the first sighting element is about 5.25 inches.

\* \* \* \* \*